(12) United States Patent
Lopez

(10) Patent No.: US 7,427,194 B1
(45) Date of Patent: Sep. 23, 2008

(54) HEATABLE ICE CREAM SCOOPING IMPLEMENT

(76) Inventor: Renae A. Lopez, 9704 Mottown Rd., Deerfield, OH (US) 44411

( * ) Notice: Subject to any disclaimer, the term of this patent is extended or adjusted under 35 U.S.C. 154(b) by 188 days.

(21) Appl. No.: 11/355,689

(22) Filed: Feb. 17, 2006

(51) Int. Cl.
| | |
|---|---|
| *B28B 1/00* | (2006.01) |
| *B28B 17/00* | (2006.01) |
| *B29C 45/40* | (2006.01) |
| *B29C 47/00* | (2006.01) |
| *A01J 21/00* | (2006.01) |
| *A01J 25/00* | (2006.01) |
| *A21C 3/00* | (2006.01) |
| *A21C 11/00* | (2006.01) |
| *A23G 1/20* | (2006.01) |
| *A23G 1/22* | (2006.01) |
| *A23G 3/00* | (2006.01) |
| *F16C 3/00* | (2006.01) |
| *E05B 41/00* | (2006.01) |

(52) U.S. Cl. .................. 425/279; 425/276; 425/277; 425/278; 425/280; 425/281; 425/282; 425/283; 425/284; 425/285; 425/286; 425/187; 425/221; 70/174; 70/192; 70/432; 285/7; 285/317; 285/921

(58) Field of Classification Search ......... 425/276–287, 425/187, 221; 70/174, 192, 432; 285/7, 285/317, 921; 429/1–347
See application file for complete search history.

(56) References Cited

U.S. PATENT DOCUMENTS

| | | | |
|---|---|---|---|
| 1,906,131 A | * | 4/1933 | Baylis .................. 362/200 |
| 2,502,105 A | * | 3/1950 | Segal .................. 362/186 |
| 3,513,290 A | | 5/1970 | Burley et al. |
| 4,553,921 A | | 11/1985 | Lamphere et al. |
| D305,852 S | | 2/1990 | Clement et al. |
| 5,000,672 A | * | 3/1991 | Halimi .................. 425/279 |
| 5,044,914 A | | 9/1991 | Schulling |
| 6,416,309 B1 | | 7/2002 | Michlitsch et al. |
| 6,431,607 B1 | * | 8/2002 | Kittelmann et al. ......... 285/7 |
| D490,666 S | | 6/2004 | Gordon |

FOREIGN PATENT DOCUMENTS

| | | | |
|---|---|---|---|
| FR | 2640866 A1 | * | 6/1990 |
| GB | 2388300 A | * | 11/2003 |

OTHER PUBLICATIONS

Brandt, Lutz et al., "Conducting Materials" in Wiley Encyclopedia of Electrical and Electronics Engineering, Dec. 27, 1999, pp. 81-82.*

* cited by examiner

*Primary Examiner*—Dah-Wei Yuan
*Assistant Examiner*—Magali P Theodore

(57) ABSTRACT

An ice cream scooping implement includes an elongated handle that has an axial bore extending from a handle distal end and terminates approximately midway therealong. The handle has an end cap removably mated to a proximal end thereof. A scooping section is telescopically and removably insertable into the axial bore and includes a mechanism for locking the scooping section within the handle. A heating element is concentrically seated about a proximal portion of the scooping section, is in direct contact with the scooping section, is isolated from the handle, and is formed from thermal-conductive and electrical-conductive material, including tungsten. The heating element includes a pair of conductive terminals that extend proximally along a longitudinal length thereof. A mechanism is included for supplying power to the heating element. The terminals are directly engaged with the power supplying mechanism.

13 Claims, 4 Drawing Sheets

HEATABLE ICE CREAM SCOOPING IMPLEMENT

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to scooping implements and, more particularly, to a heatable ice cream scooping implement for assisting a user to effectively extract ice cream from a container.

2. Prior Art

Using scoops, spades, and spoons, ice cream is commonly transferred from a storage container to a serving dish or cone. If the ice cream is hard packed, removing a serving of ice cream from the storage container may require application of a significant cutting force. This force may be too great for some individuals to apply, especially when applied repetitively, as is required, for example, of ice cream parlor employees. Furthermore, the ice cream often adheres to the scoop after separation from the storage container, making it difficult to transfer the ice cream to the serving dish or cone.

To reduce the required cutting force, scoops often are warmed prior to use, for example, by being placed in a container of heated water. In use, the scoop then conducts thermal energy to the ice cream with which it comes in contact, thereby softening or slightly melting the ice cream. The force needed to cut through and remove the serving of softened ice cream is thus significantly reduced. Additionally, the ice cream is less likely to adhere to the scoop and is easier to transfer to a serving dish or cone.

Though the foregoing method may be effective, heated water containers often are used to warm several scoops simultaneously, thereby creating unsanitary and aesthetically unattractive conditions. In addition, this previously known method presents a risk of contamination when a scoop transfers unsanitary water to the ice cream within the storage container. Furthermore, the scoop must frequently be returned to the water bath to maintain an elevated temperature, prolonging the time and effort required to prepare an ice cream serving.

Numerous previously known methods and apparatuses have been proposed for serving ice cream that seeks to obtain the benefits derived from elevating scoop temperature, without suffering the frequent heating delays and risk of contamination associated with heated water baths. One prior art example describes a hollow scoop with a removable cap that facilitates filling the scoop with warm tap water before use. The device is only effective for short-term use; however, the apparatus is expected to be able to sustain an elevated temperature for only relatively short periods of time before the warm water inside the scoop cools, thus requiring repetitive replacement of the water. This is obviously not desirable in situations where extended and continuous use of the ice cream scooper is required.

Several commercially available products seal a quantity of water or antifreeze within a hollow handled scoop, so that the sealed liquid acts as a heat sink. While the heat sink is supposed to decrease the rate at which the cutting surface of such a scoop drops from room temperature towards the temperature of the ice cream, applicants' tests of such devices have shown these heat sinks provide little additional benefit to the user, as compared to traditional, solid-handle scoops. Typically, the storage container from which the serving of ice cream is removed provides a much larger heat sink than the sealed liquid within the scoop handle, and, consequently, the cutting surfaces of such previously known devices rapidly approach the ice cream temperature. Moreover, even if such devices reduced the cooling rate at the cutting surface, they provide no benefit in decreasing the initial cutting force required.

Accordingly, a need remains for a heatable ice cream scooping implement in order to overcome the above-noted shortcomings. The present invention satisfies such a need by providing a heated ice cream scooping implement that is convenient and easy to use, durable in design, provides considerable time savings, reduces the strain associated with scooping frozen ice cream, and is practical and safe to use. Such a scooping implement produces heat to soften ice cream from a container. Thus, it eliminates the frustration and strain associated with using a traditional scooper or standard spoon, which can be time consuming and ineffective. A person is able to remove a delicious scoop of ice cream without bending the spoon or having to allow the ice cream to melt until it becomes too soft and messy to enjoy. In addition, the ice cream left inside the container will not accumulate freezer burn as a result of constantly dipping a conventional scooper or spoon in water. This device is especially appealing to the elderly and arthritis sufferers, and persons find a use therefore in their homes as well as in ice cream parlors and restaurants that frequently serve ice cream.

BRIEF SUMMARY OF THE INVENTION

In view of the foregoing background, it is therefore an object of the present invention to provide a heatable ice cream scooping implement. These and other objects, features, and advantages of the invention are provided by a thermal-conductive ice cream scooping implement for advantageously and conveniently assisting a user to effectively extract ice cream from a container.

The ice cream scooping implement includes an elongated cylindrical handle that has an axial bore formed therein. Such an axial bore extends from a distal end of the handle and terminates approximately midway along a longitudinal length of the handle. The handle further has an end cap that is removably mated directly to a proximal end thereof. Such a handle may further be provided with a pair of coextensively shaped chambers formed at the proximal end thereof. The chambers are juxtaposed adjacent to the end cap and the pair of terminals are housed within the chambers respectively.

A scooping section is telescopically and removably insertable into the axial bore of the handle. Such a scooping section preferably includes a semi-spherical head provided with a concave interior distally spaced away from the distal end of the handle. An elongated rigid shaft is monolithically formed with the head. Such a shaft is slidably and linearly nested within the axial bore. The shaft has a linear aperture formed therein such that the aperture extends perpendicular to a longitudinal axis of the handle.

The scooping section includes a mechanism for locking the scooping section within the handle such that the scooping section is advantageously and effectively prohibited from moving along an x-axis and a y-axis. Such a locking mechanism preferably includes a lever that has a main shaft and an auxiliary shaft monolithically formed therewith. The auxiliary shaft is registered orthogonal to the main shaft and penetrates through the aperture. Such an auxiliary shaft has a resilient spring member directly attached to an end thereof. The spring member is nested within a groove formed within the handle for conveniently and effectively allowing the user to release the lever from the aperture through a spring-release action. The scooping section is statically conjoined with the handle while the auxiliary shaft is positioned through the aperture.

A heating element is concentrically seated about a proximal portion of the scooping section and is in direct contact therewith. Such a heating element is formed from thermal-conductive and electrical-conductive material, wherein the heating element includes tungsten. The heating element includes a pair of conductive terminals that extend proximally along a longitudinal length of the heating element. Such a heating element is isolated within the handle.

A mechanism is included for selectively supplying power to the heating element. The terminals of the heating element are directly and continuously engaged with the power supplying mechanism during operating and non-operating conditions. Such a power supplying mechanism preferably includes a pair of batteries that are seated within the chambers respectively. The batteries are electrically coupled to the terminals respectively. A power switch has a flexible finger resiliently compressible for effectively engaging the batteries and establishing a conductive path with the heating element. Such a power switch further has a flange portion protruding outwardly from the end cap. The flange portion is statically affixed directly to the finger such that the user can laterally traverse the finger between engaged and disengaged positions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
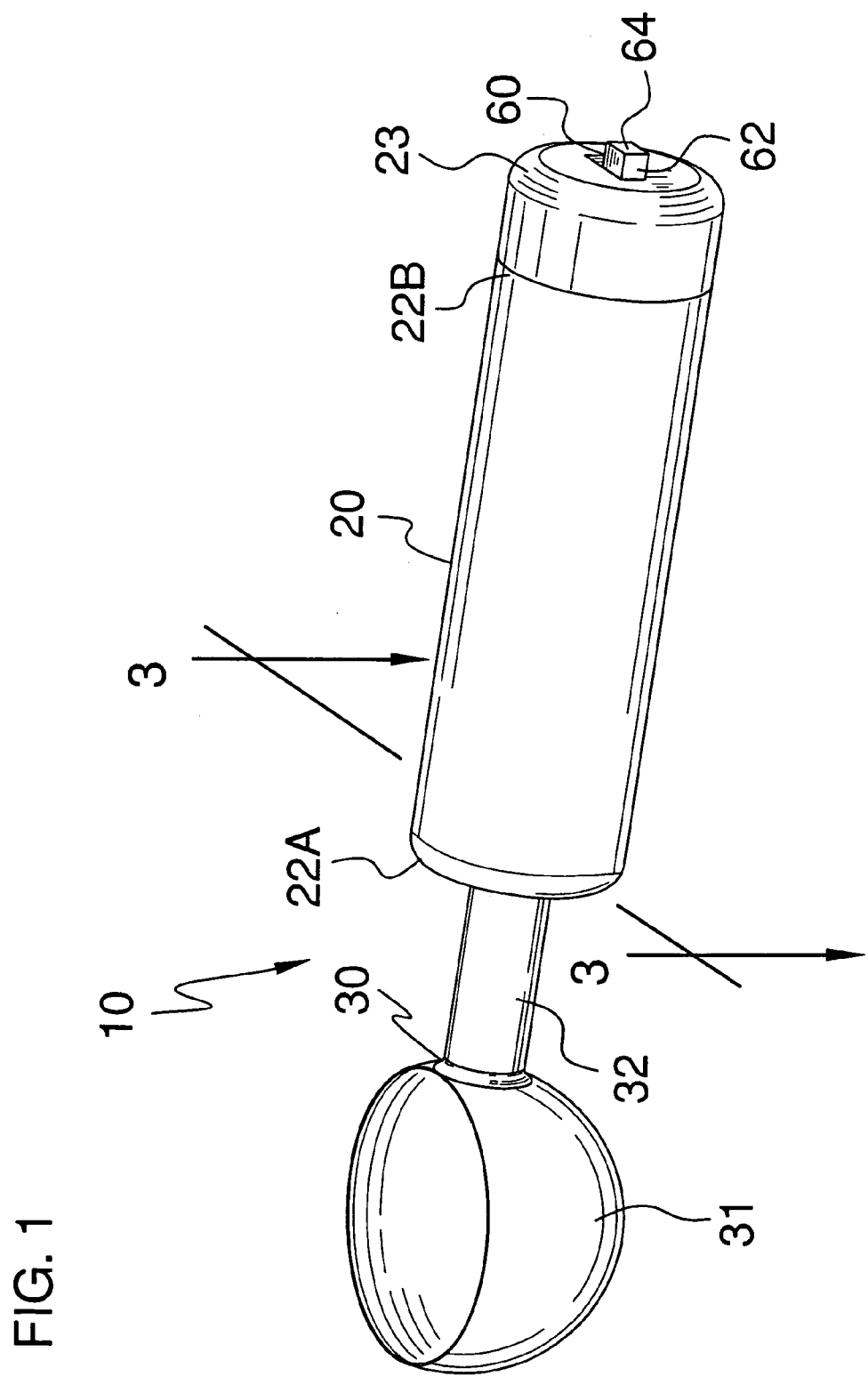
FIG. 1 is a perspective view showing a heatable ice cream scooping implement, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1-4 by the reference numeral 10 and is intended to provide a heatable ice cream scooping implement. It should be understood that the device 10 may be used to scoop many different types of frozen food stuff and other materials and should not be limited in use to only scooping frozen ice cream.

Figure 2:
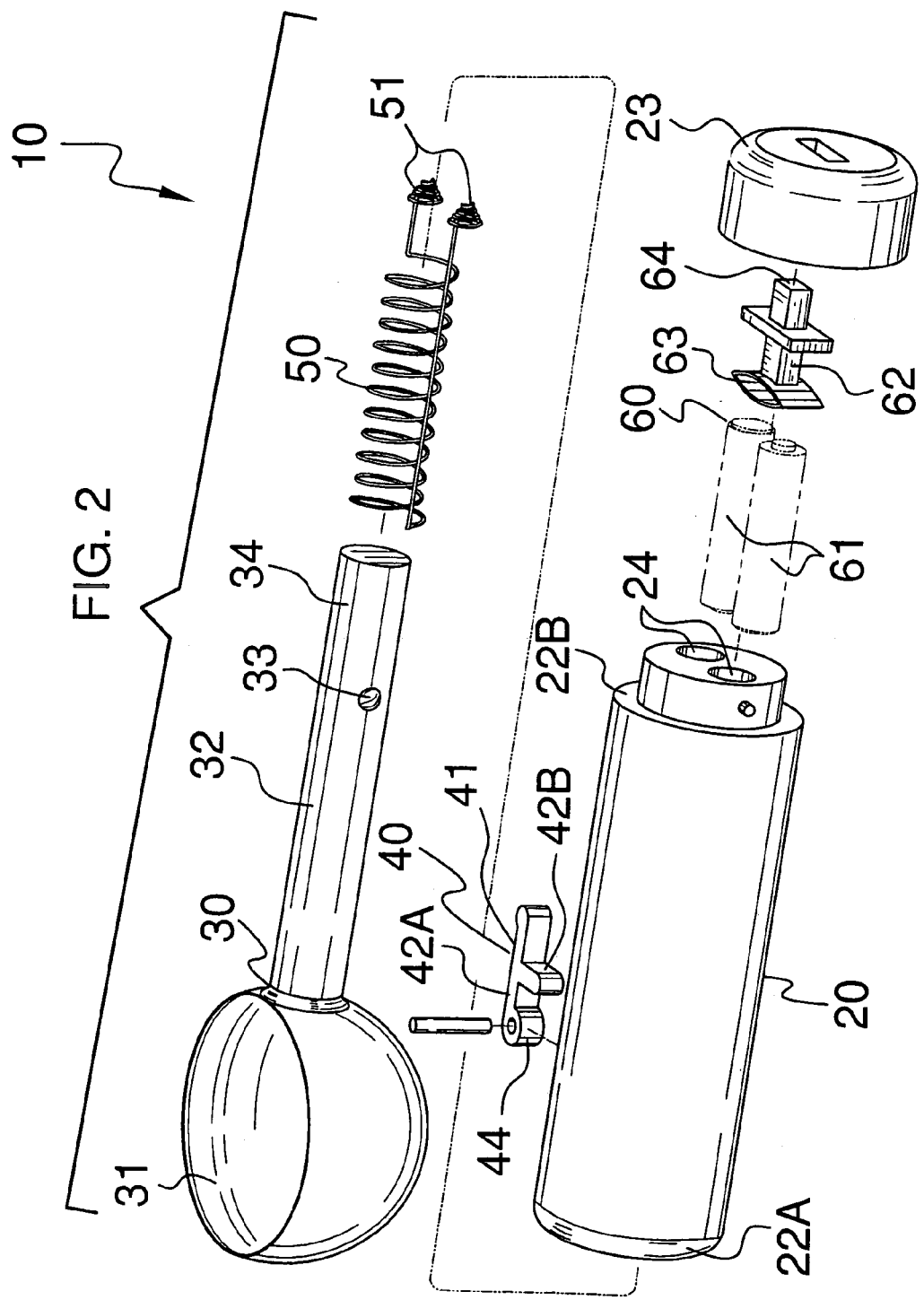
FIG. 2 is an exploded perspective view of the device shown in FIG. 1.
Figure 3:
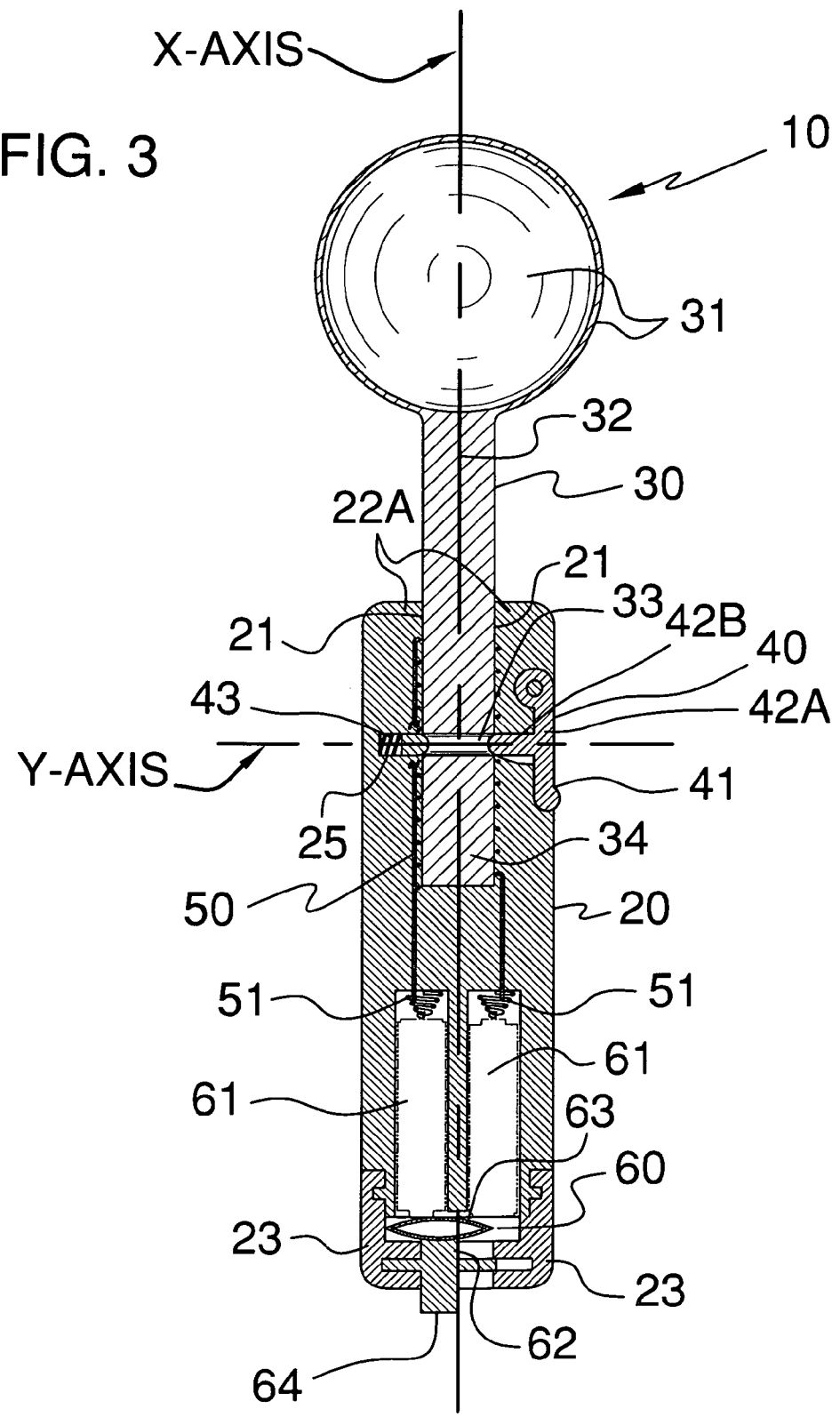
FIG. 3 is a cross-sectional view of the device shown in FIG. 1, taken along line 3-3.

Referring initially to FIGS. 1, 2 and 3, the device 10 includes an elongated cylindrical handle 20 that has an axial bore 21 formed therein. Of course, the handle 20 may be produced in a variety of alternate shapes, sizes and colors, as is obvious to a person of ordinary skill in the art. Such an axial bore 21 extends from a distal end 22A of the handle 20 and terminates approximately midway along a longitudinal length of the handle 20. The handle 20 further has an end cap 23 that is removably mated directly, without the use of intervening elements, to a proximal end 22B thereof, which is important for conveniently allowing a user to periodically access the chambers 24 (described herein below) where the batteries 61 (described herein below) are located, for inspection and replacement thereof. Such a handle 20 is further provided with a pair of coextensively shaped chambers 24 formed at the proximal end 22B thereof. The chambers 24 are juxtaposed adjacent to the end cap 23 and the pair of terminals 51 (described herein below) are housed within the chambers 24 respectively.

Again referring to FIGS. 1, 2 and 3, a scooping section 30 is telescopically and removably insertable into the axial bore 21 of the handle 20. Such a scooping section 30 includes a semi-spherical head 31 provided with a concave interior distally spaced away from the distal end 22A of the handle 20. An elongated rigid shaft 32 is monolithically formed with the head 31. Such a shaft 32 is slidably and linearly nested within the axial bore 21. The shaft 32 has a linear aperture 33 formed therein such that the aperture 33 extends perpendicular to a longitudinal axis of the handle 20. Of course, the scooping section 30 is produced from a thermal conductive material, which is crucial for allowing the scooping section 30 to conduct heat therealong, as well as maintain a temperature above that of ambient temperatures for extended periods of time, as is obvious to a person of ordinary skill in the art.

Referring to FIGS. 2 and 3, the scooping section 30 includes a mechanism 40 for locking the scooping section 30 within the handle 20, which is essential such that the scooping section 30 is advantageously and effectively prohibited from moving along an x-axis and a y-axis during operating procedures, which, if allowed, would interfere with the scooping ability of the device 10. Such a locking mechanism 40 includes a lever 41 that has a main shaft 42A and an auxiliary shaft 42B monolithically formed therewith. The auxiliary shaft 42B is registered orthogonal to the main shaft 42A and penetrates through the aperture 33. Such an auxiliary shaft 42B has a resilient spring member 43 directly attached, without the use of intervening elements, to an end 44 thereof. The spring member 43 is nested within a groove 25 formed within the handle 20, which is critical for conveniently and effectively allowing the user to release the lever 41 from the aperture 33 through a spring-release action. The scooping section 30 is statically conjoined with the handle 20 while the auxiliary shaft 42B is positioned through the aperture 33.

Figure 4:
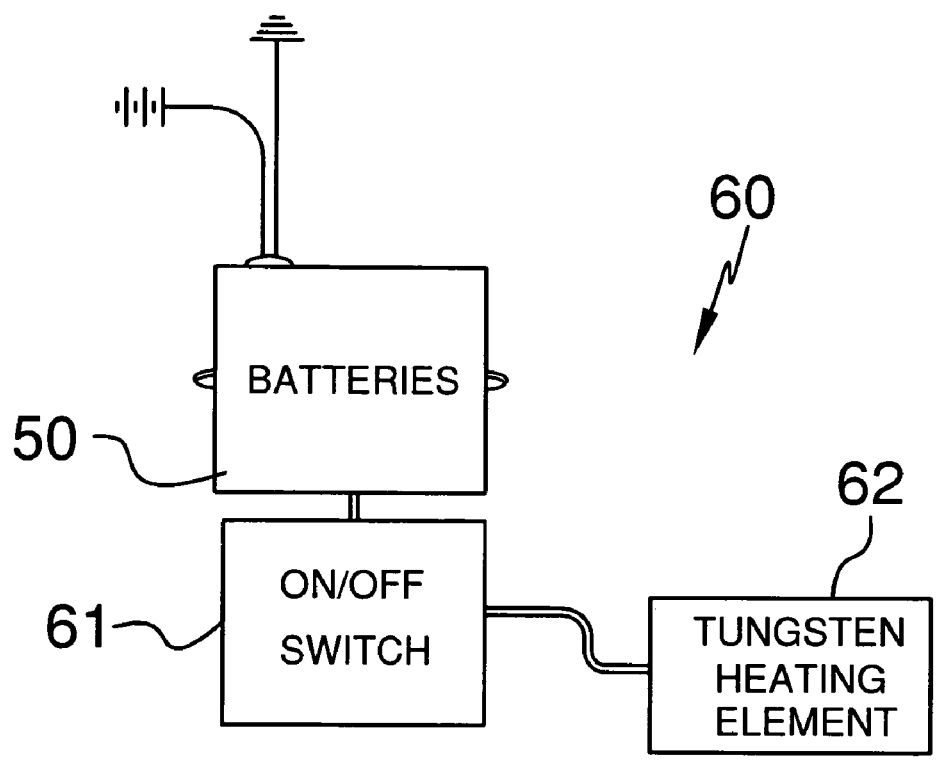
FIG. 4 is a schematic block diagram of the device shown in FIG. 1.

Referring to FIGS. 2, 3 and 4, a heating element 50 is concentrically seated about a proximal portion 34 of the scooping section 30 and is in direct contact therewith, without the use of intervening elements. Such a heating element 50 is formed from thermal-conductive and electrical-conductive material, which is important for allowing the heating element 50 to simultaneously conduct heat and electricity therethrough, wherein the heating element 50 includes tungsten. The heating element 50 includes a pair of conductive terminals 51 that extend proximally along a longitudinal length of the heating element 50. Such a heating element 50 is isolated within the handle 20, which is a crucial feature for preventing the handle 20 from becoming to hot to be comfortably held by a user.

Again referring to FIGS. 2, 3 and 4, a mechanism 60 is included for selectively supplying power to the heating element 50. The terminals 51 of the heating element 50 are directly and continuously engaged, without the use of intervening elements, with the power supplying mechanism 60 during operating and non-operating conditions. Such a power supplying mechanism 60 includes a pair of batteries 61 that are seated within the chambers 24 respectively. The batteries 61 are electrically coupled to the terminals 51 respectively.

A power switch 62 has a flexible finger 63 resiliently compressible that is crucial for effectively engaging the batteries 61 and establishing a conductive path with the heating element 50. Such a power switch 62 further has a flange portion 64 protruding outwardly from the end cap 23. The flange portion 64 is statically affixed directly, without the use of intervening elements, to the finger 63, which is a vital feature such that the user can laterally traverse the finger 63 between engaged and disengaged positions. Of course, the power switch 62 may be located at any other suitable point along the handle 20, as is obvious to a person of ordinary skill in the art.

In use, a person simply snaps the scooping section 30 into the axial bore 21 of the handle 20 and activates the power switch 62 of the power supplying mechanism. Once the heating element 50 has sufficiently raised the temperature of the scooping section 30, a user can quickly and easily scoop frozen ice cream from a container. When finished, a user turns the power switch 62 to the off position and detaches the scooping section 30 by disengaging the locking mechanism 40, for easily cleaning the scooping section 30 under running water or in a dishwasher.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A thermal-conductive ice cream scooping implement for assisting a user to effectively extract ice cream from a container, said ice cream scooping implement comprising:
   an elongated cylindrical handle having an axial bore formed therein, said axial bore extending from a distal end of said handle and terminating approximately midway along a longitudinal length of said handle, said handle further having an end cap removably mated directly to a proximal end thereof;
   a scooping section linearly and removably insertable into said axial bore of said handle, said scooping section including means for locking said scooping section within said handle such that said scooping section is prohibited from moving along an x-axis and a y-axis;
   a heating element concentrically seated about a proximal portion of said scooping section and being in direct contact therewith, said heating element being formed from thermal-conductive and electrical-conductive material, said heating element including a pair of conductive terminals extending proximally along a longitudinal length of said heating element; and
   means for selectively supplying power to said heating element;
   wherein said terminals of said heating element are directly and continuously engaged with said power supplying means during operating and non-operating conditions;
   wherein said heating element has a helical-pattern disposed about a linear portion of said scooping section, said heating element having a longitudinal length extending parallel to said x-axis.

2. The device of claim 1, wherein said handle is further provided with a pair of coextensively shaped chambers formed at said proximal end thereof, said chambers being juxtaposed adjacent to said end cap, said pair of terminals being housed within said chambers respectively.

3. The device of claim 1, wherein said power supplying means comprises:
   a pair of batteries seated within said chambers respectively, said batteries being electrically coupled to said terminals respectively; and
   a power switch having a flexible finger resiliently compressible for engaging said batteries and establishing a conductive path with said heating element, said power switch further having a flange portion protruding outwardly from said end cap, said flange portion being statically affixed directly to said finger such that the user can laterally traverse said finger between engaged and disengaged positions.

4. The device of claim 1, wherein said scooping section comprises:
   a semi-spherical head provided with a concave interior distally spaced away from said distal end of said handle; and
   an elongated rigid shaft monolithically formed with said head, said shaft being slidably and linearly nested within said axial bore, said shaft having a linear aperture formed therein such that said aperture extends perpendicular to a longitudinal axis of said handle.

5. The device of claim 4, wherein said locking means comprises:
a lever having a main shaft and an auxiliary shaft monolithically formed therewith, said auxiliary shaft being registered orthogonal to said main shaft and penetrating through said aperture, said auxiliary shaft having a resilient spring member directly attached to an end thereof, said spring member being nested within a groove formed within said handle for allowing the user to release said lever from said aperture through a spring-release action, said scooping section being statically conjoined with said handle while said auxiliary shaft is positioned through said aperture.

6. A thermal-conductive ice cream scooping implement for assisting a user to effectively extract ice cream from a container, said ice cream scooping implement comprising:
an elongated cylindrical handle having an axial bore formed therein, said axial bore extending from a distal end of said handle and terminating approximately midway along a longitudinal length of said handle, said handle further having an end cap removably mated directly to a proximal end thereof;
a scooping section linearly and removably insertable into said axial bore of said handle, said scooping section including means for locking said scooping section within said handle such that said scooping section is prohibited from moving along an x-axis and a y-axis;
a heating element concentrically seated about a proximal portion of said scooping section and being in direct contact therewith, said heating element being formed from thermal-conductive and electrical-conductive material, wherein said heating element comprises tungsten, said heating element including a pair of conductive terminals extending proximally along a longitudinal length of said heating element; and
means for selectively supplying power to said heating element;
wherein said terminals of said heating element are directly and continuously engaged with said power supplying means during operating and non-operating conditions;
wherein said heating element has a helical-pattern disposed about a linear portion of said scooping section, said heating element having a longitudinal length extending parallel to said x-axis.

7. The device of claim 6, wherein said handle is further provided with a pair of coextensively shaped chambers formed at said proximal end thereof, said chambers being juxtaposed adjacent to said end cap, said pair of terminals being housed within said chambers respectively.

8. The device of claim 6, wherein said power supplying means comprises:
a pair of batteries seated within said chambers respectively, said batteries being electrically coupled to said terminals respectively; and
a power switch having a flexible finger resiliently compressible for engaging said batteries and establishing a conductive path with said heating element, said power switch further having a flange portion protruding outwardly from said end cap, said flange portion being statically affixed directly to said finger such that the user can laterally traverse said finger between engaged and disengaged positions.

9. The device of claim 6, wherein said scooping section comprises:

a semi-spherical head provided with a concave interior distally spaced away from said distal end of said handle; and
an elongated rigid shaft monolithically formed with said head, said shaft being slidably and linearly nested within said axial bore, said shaft having a linear aperture formed therein such that said aperture extends perpendicular to a longitudinal axis of said handle.

10. The device of claim 9, wherein said locking means comprises:
a lever having a main shaft and an auxiliary shaft monolithically formed therewith, said auxiliary shaft being registered orthogonal to said main shaft and penetrating through said aperture, said auxiliary shaft having a resilient spring member directly attached to an end thereof, said spring member being nested within a groove formed within said handle for allowing the user to release said lever from said aperture through a spring-release action, said scooping section being statically conjoined with said handle while said auxiliary shaft is positioned through said aperture.

11. A thermal-conductive ice cream scooping implement for assisting a user to effectively extract ice cream from a container, said ice cream scooping implement comprising:
an elongated cylindrical handle having an axial bore formed therein, said axial bore extending from a distal end of said handle and terminating approximately midway along a longitudinal length of said handle, said handle further having an end cap removably mated directly to a proximal end thereof;
a scooping section linearly and removably insertable into said axial bore of said handle, said scooping section including means for locking said scooping section within said handle such that said scooping section is prohibited from moving along an x-axis and a y-axis;
a heating element concentrically seated about a proximal portion of said scooping section and being in direct contact therewith, said heating element being formed from thermal-conductive and electrical-conductive material, wherein said heating element comprises tungsten, said heating element including a pair of conductive terminals extending proximally along a longitudinal length of said heating element, wherein said heating element is isolated within said handle; and
means for selectively supplying power to said heating element;
wherein said terminals of said heating element are directly and continuously engaged with said power supplying means during operating and non-operating conditions;
wherein said heating element has a helical-pattern disposed about a linear portion of said scooping section, said heating element having a longitudinal length extending parallel to said x-axis;
wherein said scooping section comprises
a semi-spherical head provided with a concave interior distally spaced away from said distal end of said handle; and
an elongated rigid shaft monolithically formed with said head, said shaft being slidably and linearly nested within said axial bore, said shaft having a linear aperture formed therein such that said aperture extends perpendicular to a longitudinal axis of said handle;
wherein said locking means comprises
a lever having a main shaft and an auxiliary shaft monolithically formed therewith, said auxiliary shaft being registered orthogonal to said main shaft and penetrating through said aperture, said auxiliary shaft having a resilient spring member directly attached to an end thereof, said spring member being nested within a groove formed within said handle for allowing the user to release said lever from said aperture through a spring-release action, said scooping section being statically conjoined with said handle while said auxiliary shaft is positioned through said aperture;

wherein said spring member is compressible along said y-axis.

12. The device of claim 11, wherein said handle is further provided with a pair of coextensively shaped chambers formed at said proximal end thereof, said chambers being juxtaposed adjacent to said end cap, said pair of terminals being housed within said chambers respectively.

13. The device of claim 11, wherein said power supplying means comprises:

a pair of batteries seated within said chambers respectively, said batteries being electrically coupled to said terminals respectively; and a power switch having a flexible finger resiliently compressible for engaging said batteries and establishing a conductive path with said heating element, said power switch further having a flange portion protruding outwardly from said end cap, said flange portion being statically affixed directly to said finger such that the user can laterally traverse said finger between engaged and disengaged positions.

* * * * *